United States Patent
Ziegler et al.

(10) Patent No.: US 11,655,629 B2
(45) Date of Patent: May 23, 2023

(54) SPACE SAVING SLEEVE FOR A CAST IN PLACE ANCHOR

(71) Applicant: BLACK & DECKER INC., New Britain, CT (US)

(72) Inventors: Mark Ziegler, Stamford, CT (US); Robert La Barbera, New Rochelle, NY (US); Jack Dunning, White Plains, NY (US); Mark Serokosz, New Fairfield, CT (US)

(73) Assignee: BLACK & DECKER INC., New Britain, CT (US)

( * ) Notice: Subject to any disclaimer, the term of this patent is extended or adjusted under 35 U.S.C. 154(b) by 78 days.

(21) Appl. No.: 17/089,170

(22) Filed: Nov. 4, 2020

(65) Prior Publication Data
US 2021/0148111 A1    May 20, 2021

Related U.S. Application Data

(60) Provisional application No. 62/937,451, filed on Nov. 19, 2019.

(51) Int. Cl.
*E04B 1/41*    (2006.01)

(52) U.S. Cl.
CPC .................. *E04B 1/4164* (2013.01)

(58) Field of Classification Search
CPC ........ E04B 1/41; E04B 1/4157; E04B 1/4164; F16B 5/12; F16B 5/121; F16B 5/123; F16B 5/125; F16B 5/126; F16B 5/128

USPC .................................................. 52/699, 701
See application file for complete search history.

(56) References Cited

U.S. PATENT DOCUMENTS

| | | | |
|---|---|---|---|
| 2,161,782 A | 6/1939 | Flower | |
| 3,843,080 A | 10/1974 | Imai et al. | |
| 4,007,563 A * | 2/1977 | Nakagawa | E04D 3/3606 52/378 |
| 4,118,910 A * | 10/1978 | McSherry | E04B 1/4121 52/704 |
| 4,948,089 A * | 8/1990 | Knodel | B28B 23/005 249/91 |
| 5,428,936 A | 7/1995 | Roth | |
| 6,240,697 B1 | 6/2001 | Thompson et al. | |
| 7,093,400 B1 | 8/2006 | Thompson et al. | |
| 8,201,381 B2 | 6/2012 | Heath | |
| 8,267,628 B2 * | 9/2012 | Noce | E04B 5/40 411/80.6 |
| 9,169,662 B1 | 10/2015 | Kim | |
| 9,435,465 B1 | 9/2016 | Kirschner | |
| 9,567,741 B2 | 2/2017 | Espinosa | |
| 9,982,427 B2 | 5/2018 | Grahek et al. | |
| 10,400,440 B2 | 9/2019 | Espinosa | |

(Continued)

*Primary Examiner* — William V Gilbert
(74) *Attorney, Agent, or Firm* — Kofi A. Schulterbrandt

(57) ABSTRACT

A connection sleeve for a cast-in-place anchor. The cast-in-place anchor including a suspension plate having a threaded opening. The cast-in-place anchor also including an externally threaded rod with a head. The threaded rod threadably connected to the suspension plate so that the rod and plate are perpendicular. A sleeve between the rod and plate allows the rod to be securely connected to the plate by simply urging the rod axially toward and into the sleeve to securely lock with and engage with the plate. The assembly resulting in an X shaped cast-in-place anchor assembly.

13 Claims, 3 Drawing Sheets

(56) References Cited

U.S. PATENT DOCUMENTS

| | | | |
|---|---|---|---|
| 2002/0066252 A1* | 6/2002 | Sarver | ................ E04B 1/41 |
| | | | 52/713 |
| 2009/0272067 A1 | 11/2009 | Gilham | |
| 2016/0032957 A1* | 2/2016 | Jung | ............... F16B 33/002 |
| | | | 411/111 |
| 2016/0069066 A1 | 3/2016 | Connell et al. | |
| 2018/0356033 A1 | 12/2018 | Schramm | |

* cited by examiner

SPACE SAVING SLEEVE FOR A CAST IN PLACE ANCHOR

BACKGROUND OF THE INVENTION

FIG. 1 shows a cross section of a prior art cast in place anchor 10. Cast in place anchor 10 includes a suspension plate 12 and a threaded rod 14. Threaded rod 14 includes a head 15 at a first end and an external thread toward a second end. In the assembly, threaded rod 14 is threaded through a threaded female opening (not shown) in suspension plate 12. Cast in place anchor 10 is shown set in concrete 20. Concrete 20 has been poured onto a metal decking 30. Metal decking 30 includes a series of peaks 40 and troughs 50. To position anchor 10 as shown in FIG. 1, a hole (not shown) is placed in metal decking 30 so that threaded rod 14 may pass through metal decking 30 and extend past (e.g., downward) metal decking 30.

For efficiency of use, it is beneficial to an installer of anchor 10 if anchor 10 arrives on site assembled so that threaded rod 14 is already threaded into suspension bar 12. That way, the installer need not take the time to conduct the threading process for each anchor out of the box. The installer need only further thread the threaded rod 14 into suspension bar 12 to adjust the depth of threaded rod 14 relative to suspension bar 12. Suspension bar 12 may also include fastener 13 fastener openings 712 via which it may be fastened to metal decking 30 to secure anchor 10 against movement caused by poured concrete. However, when assembled as preferred, anchor 10 is comprised of two elongate perpendicular members which configuration is not ideal for storage and shipment. The X shape assembly is bulky, and in some cases (e.g., shipment and/or storage) it would be preferable to handle the assembly as two separate elongate members. For example, two separate elongate members could be more efficiently stored in two elongate boxes. However as mentioned above, if the members were stored separately and shipped to the construction site, the installer would have to take the time to assemble each anchor 10 into the preferred ready-to-install X shaped anchor 10.

It would be beneficial in the construction industry to provide cast in place anchor 10 to the work site in to elongate storage boxes, but provide a way to much more easily assemble the two parts into the desired X shape. For example, if the two elongate parts could be securely assembled by simply axially pushing (not threading) one part (e.g., threaded rod 14) into an opening in the other part (e.g., the suspension bar 12).

SUMMARY OF THE INVENTION

The present invention may be described as a cast in place anchor assembly for securement to metal decking in a concrete structure, the assembly may include an elongate threaded anchor having a head at a first end and an externally threaded portion. The assembly also includes a connection sleeve. The connection sleeve may be internally threaded for threadably receiving the externally threaded portion of the threaded anchor. The connection sleeve further includes an external locking portion. The external locking portion includes a flexible securement portion. Also included is a suspension plate for spanning two peaks of the metal decking, the suspension plate including a sleeve opening. The sleeve opening may be sized to receive the external locking portion so that the external locking portion is lockably securable to the connection sleeve in the sleeve opening via the flexible securement portion. Furthermore, the flexible securement portion may have a flexible locking member which has a first radius which is larger than the sleeve opening and which flexes to a smaller radius during insertion of the connection sleeve into the sleeve opening and which flexes back to a size larger than the sleeve opening upon a complete insertion to lock the connection sleeve to the suspension plate.

BRIEF DESCRIPTION OF THE PREFERRED EMBODIMENTS

Figure 1:
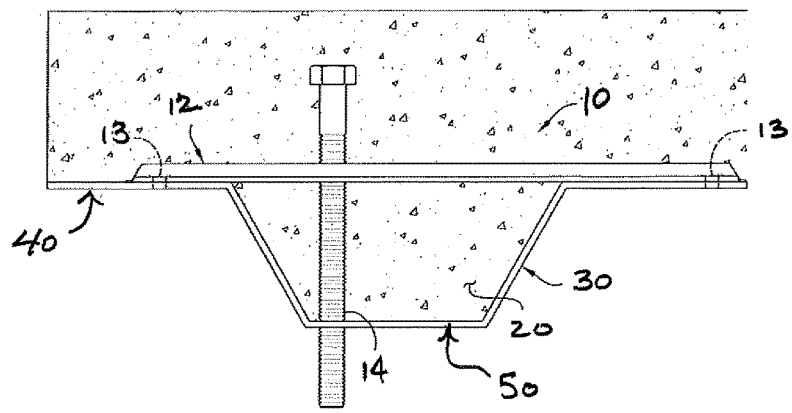
FIG. 1 Shows a cross-sectional view of a prior art cast-in-place anchor installed to a metal decking and set in concrete.
Figure 2A:
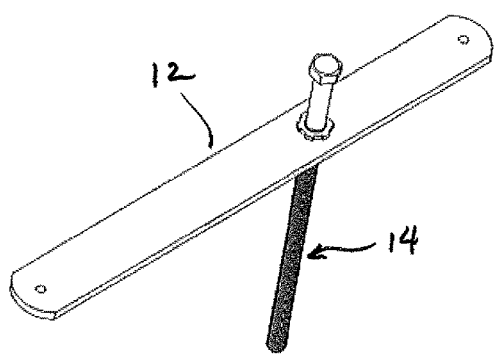
FIG. 2A shows a top perspective view of the cast-in-place anchor of the present invention.
Figure 2B:
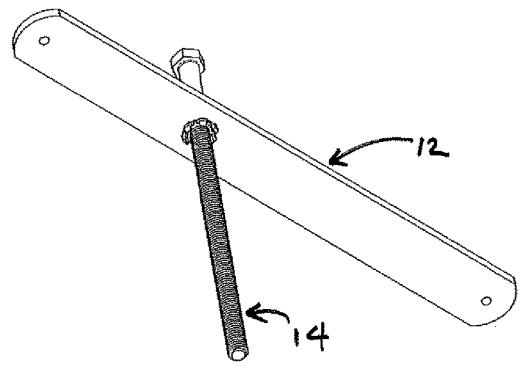
FIG. 2B shows a bottom perspective view of the cast-in-place anchor of FIG. 2A.
Figure 2C:
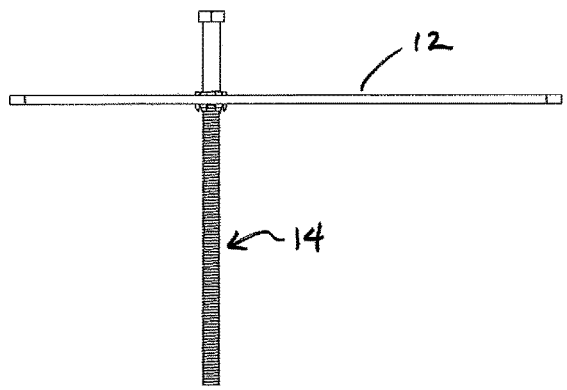
FIG. 2C shows a side perspective view of the cast-in-place anchor of FIGS. 2A and 2B.
Figure 3A:
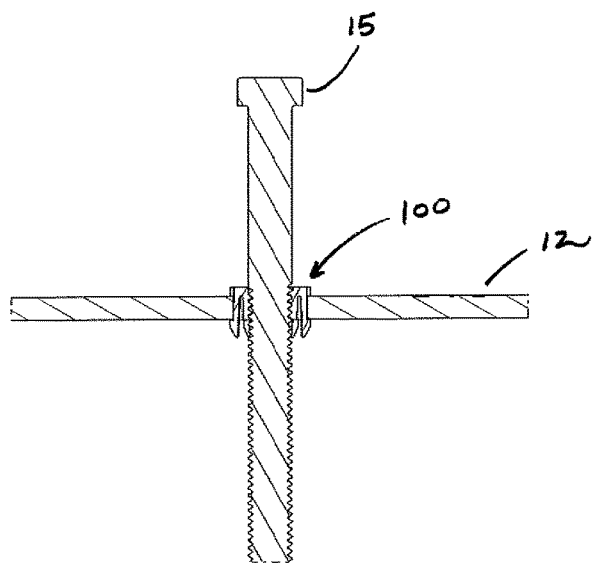
FIG. 3A shows a cross-sectional view of the anchor of FIG. 2 long ways through the suspension bar.
Figure 3B:
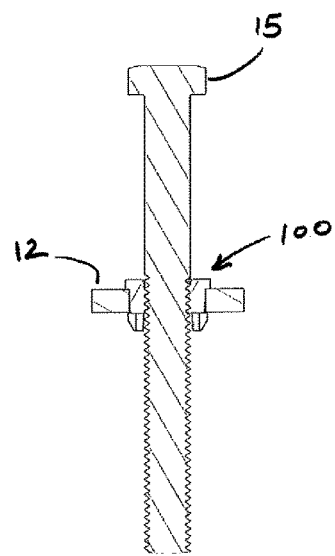
FIG. 3B shows a cross-sectional view of the anchor of FIG. 2 short ways through the suspension bar.
Figure 4A:
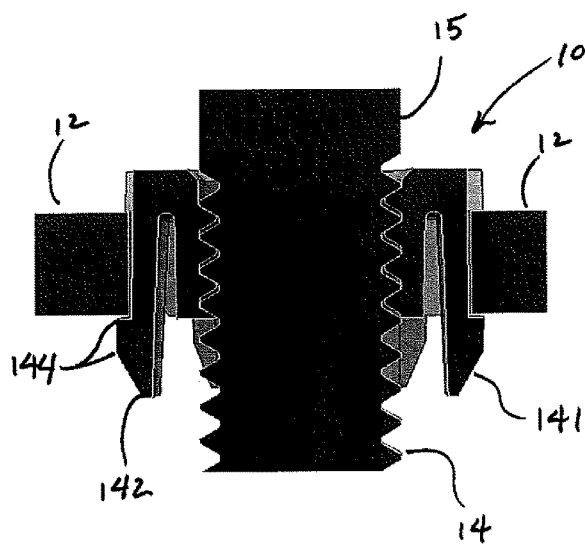
FIGS. 4A and 4B show cross-sectional views of the connection sleeve of the cast-in-place anchor of FIG. 2.
Figure 4B:
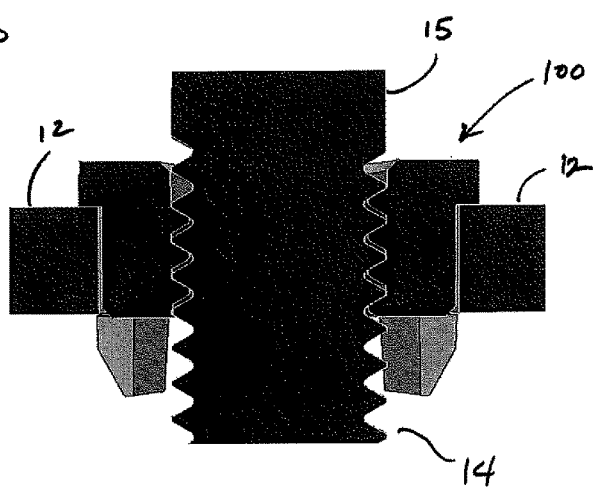
Figure 5A:
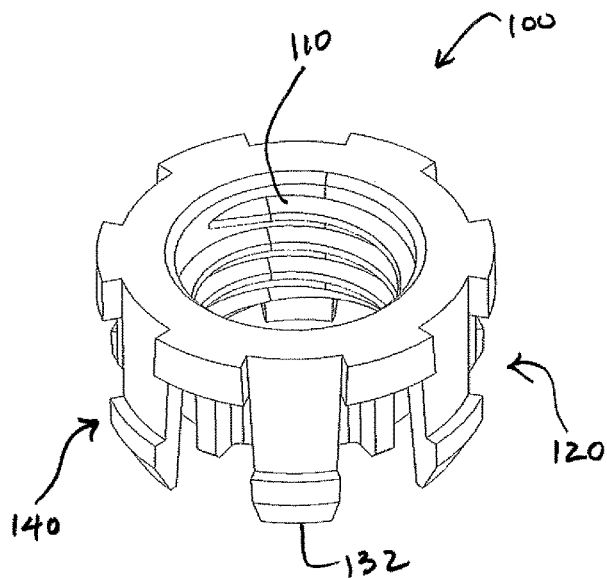
FIG. 5A shows a top perspective view of the connection sleeve of the cast-in-place anchor of FIG. 2
Figure 5B:
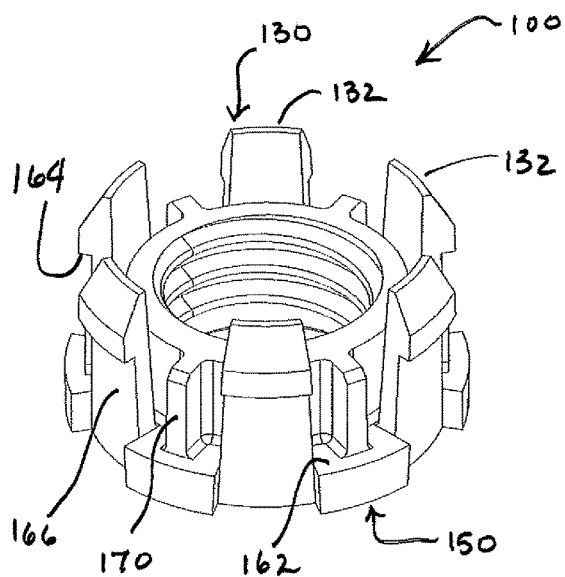
FIG. 5B shows a bottom perspective view of the connection sleeve of the cast-in-place anchor of FIG. 2.

FIGS. 2A, 2B, and 2C each show different orientations of cast in place anchor 10 in the X shaped configuration of anchor 10. FIGS. 3A and 3B show cross sectional views of anchor 10. Specifically, FIG. 3A shows a cut longitudinally down the suspension bar, while FIG. 3B shows a cut perpendicular to the FIG. 3A cut. FIG. 3A also shows a connection sleeve 100. Connection sleeve 100 may be plastic or metal or other flexible member. Connection sleeve 100 is positioned between suspension bar 12 and threaded rod 14 to secure threaded rod 14 to suspension bar 12 in the T or X shaped installation configuration. As mentioned above, connection sleeve 100 includes an inner female thread for threadably mating with the external thread of threaded rod 14. Connection sleeve 100 and its interconnection with threaded rod 14 in shown in greater detail in FIGS. 4A, 4B, 5A and 5B.

Referring to FIGS. 4A, 4B, 5A and 5B, connection sleeve 100 includes an internally threaded portion 110 and an external locking portion 120. External locking portion 120 is for securely connecting or locking the connection sleeve 100 to an opening 710 in suspension plate 12. External locking portion 120 includes a flexible portion 130. Flexible portion 130 may be in the form of downwardly extending cantilevered legs 132 and may include a locking member 140 which has a first configuration where its radius is greater than a radius of opening 710. Locking member 140 is also positionable in a second configuration in which its radius is smaller than the radius of opening 710. Therefore, locking member 140 is reconfigurable so that its locking member may be flexed from the larger radius to the smaller radius and then memory flexed at rest back to the larger radius.

Connection sleeve 100 may include an enlarged head 150 which is larger than opening 710. A surface 162 on a lower portion of head 150 engages a top surface of suspension plate 12 when connection sleeve 100 is assembled with suspension bar 12. In addition, an upper portion of locking member 140 includes a surface 162 which engages a lower portion of suspension plate 12 when connection sleeve 100 is assembled to suspension plate 12. Furthermore, legs 132 may include a radially outward facing wall that engages an inner radius of opening 710 when connection sleeve 100 is assembled to suspension plate 12. Together, surfaces 162, 164 and 166 form a lock surface that secures connection sleeve 100 relative to suspension plate 12. Radial walls 170 also help secure connection sleeve 100 in suspension bar 12 by engaging an inner wall radius of opening 710 and thereby limiting radial movement of connection sleeve 100 when connection sleeve 100 is assembled to suspension sleeve 12.

Furthermore, locking member 140, at rest, may have a taper 141 where an inner portion of the taper 142 has a radius that is smaller than opening 710 and an outer portion of the taper 144 has a radius that is larger than opening 710. Taper 141 therefore allows connection sleeve 100 to be urged axially into engagement with opening 710 of suspension bar 12. Specifically, a user may hold threaded rod 14 at the end which has head 15 and with legs 132 pointed away from head 15 the user may insert (e.g., legs 132 first) inner portion 142 into opening 710 until opening 710 engages taper 141. The user may then further insert connection sleeve 100 into opening 710 so that taper 140 urges legs 132 to flex inward until outer portion 144 clears opening 710 and locking member 140 flexes back to a rest position to trap suspension bar 12 between lock surfaces 162, 164 and 166. Such a configuration allows a user to simply hold head 15 of threaded rod 14, insert an end of threaded rod 14 opposite head 15 into opening 710 and continue to insert threaded rod 14 with a connection sleeve installed thereon perpendicularly into opening 710 until connection sleeve 100 snaps connected to suspension plate 12.

While the above methods of locking connection sleeve 100 to suspension plate 12 (i.e., flexible snap lock) and locking connection sleeve 100 to threaded rod 14 (i.e., threaded connection) are described above, other methods of connection may be used. For example, a threaded connection could be used between connection sleeve 100 and suspension plate 12. Likewise, for example, a groove and projection connection could be used that allows threaded rod 14 to axially increment relative to connection sleeve 100 through discrete locking positions.

Figure 6:
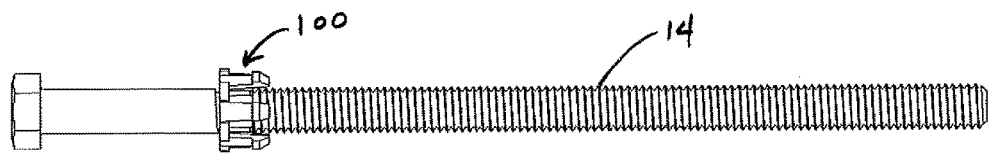
FIG. 6 shows a side view of the threaded rod secured in the connection sleeve of the cast-in-place anchor of FIG. 2.
Figure 7:
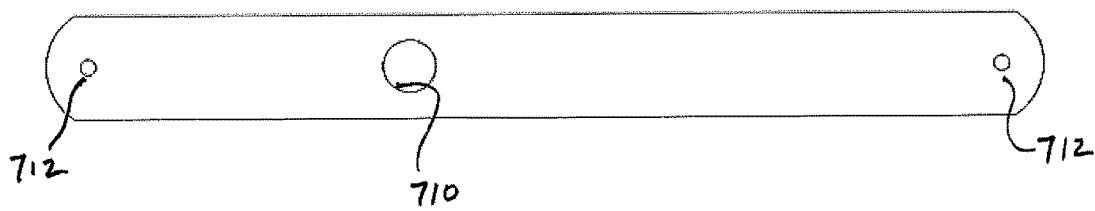
FIG. 7 shows a top view of the suspension plate of the cast-in-place anchor of FIG. 2.

FIG. 6 shows a connection sleeve 100 threadably secured to a threaded rod 14. The two pieces form one generally elongate member that is easily and efficiently cored in an elongage storage space (e.g., a shipping box). FIG. 7 shows a suspension bar which also represents an elongate member that is easily and efficiently stored in an elongate storage space (e.g., a shipping box). When the boxes arrive at the jobsite for installation in a cast-in-place environment, a user can easily assemble the anchor into the X shaped anchor configuration by the axial snap-in method described above.

What is claimed is:

1. A cast in place anchor assembly for securement to metal decking in a concrete structure, the assembly comprising:
    an elongate threaded anchor including a head at a first end and an externally threaded portion; and
    a connection sleeve, the connection sleeve being internally threaded for threadably receiving the externally threaded portion, the connection sleeve further including an external locking portion, the external locking portion including a flexible securement portion;
    a suspension plate for spanning two peaks of the metal decking, the suspension plate including a sleeve opening;
    wherein the sleeve opening is sized to receive the external locking portion so that the external locking portion is lockably securable to the connection sleeve in the sleeve opening via the flexible securement portion; and
    wherein the flexible securement portion has a flexible locking member which has a first radius which is larger than the sleeve opening and which flexes to a smaller radius during insertion of the connection sleeve into the sleeve opening and which flexes back to a size larger than the sleeve opening upon a complete insertion to lock the connection sleeve to the suspension plate.

2. The cast in place anchor assembly of claim 1, wherein the flexible securement portion includes an first axial end and a second axial end and the second axial end includes a taper.

3. The cast in place anchor assembly of claim 2, wherein the taper includes a portion having a radius that is smaller than a radius of the sleeve opening a portion that is larger than the sleeve opening.

4. The cast in place anchor assembly of claim 1, wherein the flexible securement portion includes an upper axial end and a lower axial end and a plurality of legs extend cantilevered from the upper axial end toward the lower axial end.

5. The cast in place anchor assembly of claim 4, wherein the legs include a taper and wherein the taper includes a portion having a radius that is smaller than a radius of the sleeve opening and a portion that is larger than the sleeve opening.

6. The cast in place anchor assembly of claim 1, wherein the flexible securement portion includes a plurality of legs that flex radially inward to allow passage of a lower axial end of the connection sleeve through the sleeve opening and then flexes radially outward to trap the sleeve opening to secure the connection sleeve to the suspension plate.

7. The cast in place anchor assembly of claim 1, wherein the external locking portion includes a head portion at an first axial end and having a stop wall facing a first side of the suspension plate when the sleeve is connected to the suspension plate, an outwardly facing side wall, and a snap wall facing a second side of the suspension plate when the sleeve is connected to the suspension plate.

8. The cast in place anchor assembly of claim 7, wherein the stop wall, the side wall and the snap wall engage the suspension plate at the sleeve opening to secure the connection sleeve to the suspension plate.

9. The cast in place anchor assembly of claim 1, wherein when assembled, the elongate threaded anchor is perpendicular to the suspension plate.

10. A method of assembling a cast in place anchor for securement to metal decking in a concrete structure, the method comprising the steps of:
    providing an elongate threaded anchor including a head at a first end and an externally threaded portion, the externally threaded portion having a longitudinal axis;
    providing a connection sleeve, the connection sleeve being internally threaded for threadably receiving the externally threaded portion, the connection sleeve further including an external locking portion, the external locking portion including a flexible securement portion or an externally threaded portion;

providing a suspension plate for spanning two peaks of the metal decking, the suspension plate including a sleeve opening and having a longitudinal axis in an elongated direction;

threading the externally threaded portion of the elongate threaded anchor into the internal thread of the connection sleeve;

inserting the flexible securement portion into the sleeve opening until the external locking portion is secured to the sleeve opening and the elongate threaded anchor is secured to the suspension plate.

11. The method of assembly of claim 10, further comprising the step of rotating the elongate threaded anchor to adjust its depth with respect to the suspension plate.

12. The method of assembly of claim 10, wherein the secured to the sleeve opening is a securement by snapping or by threading the connection sleeve into the sleeve opening.

13. The method of assembly of claim 10, further comprising the steps of storing multiple elongate threaded anchors in a container so that their longitudinal axes are generally parallel and storing multiple suspension plates such that their longitudinal axes are generally parallel.

* * * * *